United States Patent
Joshi et al.

(10) Patent No.: US 7,056,976 B2
(45) Date of Patent: Jun. 6, 2006

(54) PULTRUSION SYSTEMS AND PROCESS

(75) Inventors: Ravi R. Joshi, Auburn Hills, MI (US); Evan H. Cheolas, Sterling Heights, MI (US)

(73) Assignee: Huntsman International LLC, Salt Lake City, UT (US)

( * ) Notice: Subject to any disclaimer, the term of this patent is extended or adjusted under 35 U.S.C. 154(b) by 172 days.

(21) Appl. No.: 10/626,983

(22) Filed: Jul. 25, 2003

(65) Prior Publication Data

US 2004/0106726 A1 Jun. 3, 2004

Related U.S. Application Data

(60) Provisional application No. 60/401,741, filed on Aug. 6, 2002.

(51) Int. Cl.
*C08L 18/28* (2006.01)
*B32B 27/04* (2006.01)

(52) U.S. Cl. ................ 524/590; 524/589; 264/137; 428/297.4

(58) Field of Classification Search .............. None
See application file for complete search history.

(56) References Cited

U.S. PATENT DOCUMENTS

| | | | | |
|---|---|---|---|---|
| 5,071,939 A * | 12/1991 | Fukami et al. | ............... | 528/53 |
| 5,294,461 A * | 3/1994 | Ishida | ............... | 427/293 |
| 5,382,626 A * | 1/1995 | Credali et al. | ............... | 525/126 |
| 5,391,665 A * | 2/1995 | Matsunaga et al. | ............... | 526/211 |
| 5,614,575 A * | 3/1997 | Kotschwar | ............... | 524/270 |
| 2004/0094859 A1* | 5/2004 | Cheolas et al. | ............... | 264/136 |

FOREIGN PATENT DOCUMENTS

| | | |
|---|---|---|
| EP | 0 284253 | 9/1988 |
| EP | 0 359456 | 3/1990 |
| WO | WO 00/29459 | 5/2000 |

* cited by examiner

*Primary Examiner*—Jeffrey B. Robertson
(74) *Attorney, Agent, or Firm*—Nicole Graham

(57) ABSTRACT

Polyisocyanate-based reaction systems, a pultrusion process of those systems to produce reinforced matrix composites, and to composites produced thereby. The polyisocyanate-based systems are mixing activated reaction systems that include a polyol composition, an optional chain extender or crosslinker, and a polyisocyanate. The polyisocyanate-based systems exhibit improved processing characteristics in the manufacture of fiber reinforced thermoset composites via reactive pultrusion.

16 Claims, No Drawings

PULTRUSION SYSTEMS AND PROCESS

CROSS REFERENCE TO RELATED APPLICATIONS

This application claims priority to U.S. Provisional Application, Ser. No. 60/401,741, which was filed on Aug. 6, 2002.

FIELD OF THE INVENTION

The invention relates to polyisocyanate-based reaction systems, pultrusion of those systems to produce reinforced matrix composites, and to composites produced thereby.

BACKGROUND OF THE INVENTION

Pultrusion is a highly cost effective method for making fiber reinforced resin matrix composites. The primary raw materials used in pultrusion are resin and reinforcement. Fillers and additives, such as, but not limited to, calcium carbonate, clay, mica, pigments, and UV stabilizers, may be added to the resin to enhance the physical, chemical, and mechanical properties of the pultruded product.

Pultrusion is typically done by the injection die or open bath process. The open bath process is the most common. The injection die process, however, is gaining importance due to environmental concerns about the large amounts of volatile contaminants released in the open bath process. In a typical open bath process, reinforcement material in the form of fibers, mat or roving is pulled continuously through an open bath of resin to produce an impregnated reinforcement. The impregnated reinforcement is pulled through form plates to remove excess resin, and then through a curing die to cure the resin and yield a finished product. In the injection die pultrusion process, reinforcement material is passed through a closed injection die that has resin injection ports. The resin is injected under pressure through the ports to impregnate the reinforcement material. The impregnated reinforcement is pulled through the injection die to produce a shaped product.

Resins that have been used in the open bath and injection die methods of pultrusion include thermoset resins, such as unsaturated polyesters, epoxies, phenolics, methacrylates and the like, as well as thermoplastic resins such as PPS, ABS, Nylon 6. Blocked polyurethane prepolymers also have been used. Polyester and epoxy resins are generally slower reacting than polyisocyanate-based thermosets, such as polyurethanes and polyisocyanurates. In addition, the use of blocked polyurethane resins in pultrusion has the disadvantage of requiring deblocking of the isocyanate to form a volatile by-product. This creates environmental concerns and may cause unwanted plasticization of the cured resin.

One component resin systems that are used in pultrusion include thermoset resins, which cure through ethylenic unsaturation, such as unsaturated polyesters, vinyl esters, (meth)acrylics, and the like. These types of resins generally require the use of volatile unsaturated monomers, such styrene and/or methyl methacrylate. As such, resins of this type emit volatile organic compounds (VOC's) during processing. Engineering solutions to the VOC issue, such as the use of closed injection dies, have had only limited success in controlling these emissions and the intense odors that they produce. The monomers used in the production of isocyanate-based resins are usually much less volatile than the unsaturated monomers. Accordingly, polyisocyanate-based resin systems have some inherent advantages. However, isocyanate-based formulations have had difficulties due to their relatively high reactivity at ambient temperatures.

Direct mixing activation has also been used to form polyisocyanate-based matrix polymers in the pultrusion process. Mixing activated systems of this type generally consist of a polyisocyanate component and an isocyanate reactive component (see e.g. WO 00/29459). The mixing activated systems disclosed in the prior art generally have a limited range of processability. This is due to the highly reactive nature of the mixing activated free isocyanate based chemistry. A careful balance needs to be struck between the demands of adequate mixing and fiber wetting, the achievement of economically effective line speeds, and the physical properties required in the final pultruded composite article. The ideal mixing activated resin system has a long open time (or pot life) during (and after) mixing at relatively low temperature, but is characterized by rapid and even cure at the higher temperatures used for resin curing in the pultrusion curing die.

A need therefore exists for mixing activated isocyanate-based resin systems, such as polyisocyanurate and polyurethane resin systems, that may be used in pultrusion, especially injection die pultrusion, which provide for a better combination of long pot life and fast cure.

SUMMARY OF THE INVENTION

The invention provides a reaction system for the preparation of a fiber-reinforced composite according to the pultrusion process comprising:
  (a) a reaction mixture formed by combining an isocyanate reactive composition and a polyisocyanate composition, and
  (b) a continuous fiber reinforcing material, wherein the reaction mixture initially contains both free isocyanate groups and free alcoholic —OH groups, has a gel time of greater than 768 seconds at 25° C., and a gel time of not greater than 120 seconds at 175° C.

The invention further provides a pultrusion process for preparing a cured fiber reinforced polymer composite comprising the steps of:
  (a) pulling continuous fibers through an impregnation die,
  (b) supplying an isocyanate reactive composition and a polyisocyanate composition to produce a reaction mixture and feeding said reaction mixture to said impregnation die,
  (c) contacting said fibers with said reaction mixture in said impregnation die for a time period and at a temperature sufficient to cause substantial polymerization of the reaction mixture within the impregnation die to produce a composite of fibers coated by the reaction mixture,
  (d) directing the composite of coated fibers through a heated curing die to at least partially advance the cure of the reaction mixture so as to produce a solid fiber reinforced polymer matrix, and
  (e) drawing said solid composite from said curing die wherein said reaction mixture initially contains both free alcoholic —OH groups and free isocyanate (—NCO) groups, has a gel time of greater than 768 seconds at 25° C. and a gel time of not greater than 120 seconds at 175° C.

The invention further provides a fiber reinforced solid composite prepared according to the pultrusion process.

In preferred embodiments of the invention, the reaction mixture has a gel time at 25° C. of greater than 900 seconds. In more preferred embodiments of the invention, the reaction mixture has a gel time at 25° C. of 1000 seconds or more. In still more highly preferred embodiments of the invention, the reaction mixture has a gel time at 25° C. in the range of from 1000 seconds to 4000 seconds. In yet more highly preferred embodiments of the invention, the reaction mixture has a gel time at 25° C. in the range of from 1000 seconds to 3900 seconds, and a gel time at 175° C. of less than 120 seconds.

In other preferred embodiments, the reaction mixture is always substantially free of styrene or methyl methacrylate. In still other preferred embodiments of the invention, the reaction mixture is substantially free of organic species, other than carbon dioxide, boiling lower than 200° C. at 1 atmosphere pressure. In highly preferred embodiments of the invention, the reaction mixture remains in a liquid and flowable state, even though partial reaction has occurred, after it has been applied to the reinforcing fibers until it reaches the curing die.

DETAILED DESCRIPTION OF THE INVENTION

The invention provides a reaction system for the preparation of a fiber-reinforced composite according to the pultrusion process comprising:
(a) a reaction mixture comprising an isocyanate reactive composition and a polyisocyanate composition, and
(b) a continuous fiber reinforcing material, wherein the reaction mixture initially contains both free isocyanate groups and free alcoholic —OH groups, has a gel time of greater than 768 seconds at 25° C. and a gel time of less than 120 seconds at 175° C.

The invention further provides a pultrusion process for preparing a cured fiber reinforced polymer composite comprising the steps of:
(a) pulling continuous fibers through an impregnation die while contacting the fibers with a reaction mixture comprising an isocyanate reactive composition, a polyisocyanate composition, and optionally one or more additives, sufficient to cause substantial polymerization of the reaction mixture within the impregnation die to produce a composite of fibers coated by the reaction mixture, which is not fully cured,
(b) directing the composite of fibers coated by the reaction mixture through a heated curing die to further advance the cure of the reaction mixture so as to produce a solid fiber reinforced composite, and
(c) withdrawing the solid fiber reinforced composite from the curing die;

wherein the reaction mixture initially contains both free alcoholic —OH groups and free isocyanate (—NCO) groups, has a gel time of greater than 768 seconds at 25° C., and a gel time of less than 120 sec at 175° C.

The invention further provides a fiber reinforced solid composite prepared according to the pultrusion process.

In preferred embodiments, the reaction mixture has a gel time at 25° C. of greater than 900 seconds. In more preferred embodiments, the reaction mixture has a gel time at 25° C. of 1000 seconds or more. In still more highly preferred embodiments, the reaction mixture has a gel time at 25° C. in the range of from 1000 seconds to 4000 seconds. In yet more highly preferred embodiments, the reaction mixture has a gel time at 25° C. in the range of from 1000 seconds to 3900 seconds, and a gel time at 175° C. of less than 120 seconds.

In other preferred embodiments, the reaction mixture is always substantially free of styrene or methyl methacrylate. In still other preferred embodiments, the reaction mixture is substantially free of organic species, other than carbon dioxide, boiling lower than 180° C., more preferably free of species boiling lower than 200° C., at 1 atmosphere pressure (760 mmHg). In highly preferred embodiments, the reaction mixture remains in a liquid and flowable state, even though partial reaction has occurred, after it has been applied to the reinforcing fibers until it reaches the curing die.

WO 00/29459 provides background information on the pultrusion process with closed impregnation dies, and is incorporated herein by reference.

The isocyanate reactive composition suitable for use in the invention is a composition containing a plurality of active hydrogen groups that are reactive towards organic isocyanate groups under the conditions of processing. The most preferred isocyanate reactive compositions for use in the present invention are organic compounds, organic liquid polymers, or mixtures of such species that each individually contain a plurality of primary and/or secondary organically bound alcoholic hydroxyl groups. These polyhydroxy functional organic species (polyols) may optionally be used in combination with other kinds of organic polyfunctional isocyanate-reactive species in formulating the isocyanate reactive composition. Preferred examples of the latter are polyamines, which contain primary and/or secondary amine groups. It is within the scope of the invention, however, to use isocyanate-reactive polyfunctional organic active hydrogen species other than polyols if these provide the desired reaction profile in derived mixing activated polymer-forming reaction systems. It is also within the scope of the invention to employ active hydrogen species, which contain more than one kind of isocyanate-reactive active-hydrogen functional group. Preferred examples of the latter include aminoalcohols, which contain both isocyanate-reactive hydroxyl groups and isocyanate-reactive amino groups. Mixtures of different kinds of polyfunctional isocyanate-reactive molecular species may, of course, be used in the formulation of the isocyanate reactive composition if desired. The isocyanate reactive functional groups present are preferably of the active hydrogen type. The isocyanate reactive compositions are all preferably liquids at 25° C. All polyfunctional isocyanate-reactive molecular species present in the reaction system (that are reactive towards organic isocyanate groups under the conditions of processing and are not themselves isocyanates) are, by definition, part of the isocyanate reactive composition. The term "polyfunctional" is understood to encompass molecular species bearing two or more isocyanate reactive functional groups (that are reactive towards organic isocyanates under the conditions of processing and are not themselves isocyanate groups). The isocyanate reactive composition consists essentially of one or a combination of these polyfunctional isocyanate reactive molecular species. The isocyanate reactive composition preferably contains less than 10% by weight, more preferably less than 5% by weight, still more preferably less than 2% by weight, and most preferably less than 1% by weight (of the total weight of the isocyanate reactive composition) of monofunctional isocyanate reactive molecular species, present as impurities. It is, ideally, devoid of such monofunctional species. Monofunctional isocyanate reactive species may be added to the reaction system deliberately, as optional additives. However, such additives (added intentionally) are, by definition, outside the definition of the isocyanate reactive composition (and within the definition of optional additives, as defined further hereinbelow).

This isocyanate reactive composition preferably comprises at least one organic polyol, wherein said organic polyol has a number averaged functionality of organically bound primary or secondary alcohol groups of at least 1.8. In practicing the invention, the number averaged functionality of said polyol is from 1.8 to 10, more preferably from 1.9 to 8, still more preferably from 2 to 6, and most preferably from 2.3 to 4. More preferably, the isocyanate reactive composition consists predominantly, on a weight basis, of a polyol or mixture of polyols. Most preferably, the isocyanate reactive composition consists essentially of one or more polyols.

In practicing more specific embodiments of the invention, this isocyanate reactive composition will preferably comprise a mixture of two or more organic polyols. The individual polyols in the mixture will differ principally in regard to hydroxyl group functionality and molecular weight. In an important embodiment of the invention the organic polyols used in the isocyanate reactive composition are selected from the group consisting of softblock polyols, rigid polyols, chain extenders, crosslinkers, and combinations of these different types of polyols.

Polyols, which furnish softblock segments, are known to those skilled in the art as softblock polyols, or as flexible polyols. Such polyols generally have a number averaged molecular weight of at least about 1500 and preferably from about 1750 to about 8000, a number averaged equivalent weight of from about 400 to about 4000 preferably from about 750 to 2500, and number averaged functionality of isocyanate reactive organic —OH groups of about 1.8 to about 10 and preferably from about 2 to about 4. Such compounds include, for example, aliphatic polyether or aliphatic polyester polyols comprising primary and/or secondary hydroxyl groups. In practicing the invention, it is preferred that these softblock polyols comprise from about 0 to about 30% by weight and more preferably from about 0 to about 20% by weight of the isocyanate reactive species present in the active hydrogen composition. Preferred softblock polyols are liquid at 25° C.

Polyols that provide structural rigidity in the derived polymer are referred to in the art as rigid polyols. These are a preferred class for use in the invention. Such polyols generally have number averaged molecular weights of from 250 to about 3000, preferably from 250 to less than 1500; number averaged equivalent weights of from 80 to about 750, preferably from 85 to about 300; and number averaged isocyanate reactive group functionalities of from 2 to 10, preferably 2 to 4, and more preferably 2 to 3. Such compounds include, for example, polyether or polyester polyols comprising primary and/or secondary hydroxyl groups. Preferred rigid polyols are liquid at 25° C.

Polyols that are referred to the in the art as chain extenders and/or crosslinkers are another preferred class for use in the present invention. These have molecular weights between 60 to less than 250, preferably from 60 to about 150, equivalent weights from 30 to less than 100, preferably 30 to 70, and isocyanate-reactive group functionalities of from 2 to 4, and preferably from 2 to 3.

Examples of suitable chain-extenders/crosslinkers are simple glycols and triols, such as ethylene glycol, propylene glycol, dipropylene glycol, 1,4-butanediol, 1,3-butanediol, triethanolamine, triisopropanolamine, tripropylene glycol, diethylene glycol, triethylene glycol, glycerol, mixtures of these, and the like. The most preferred chain-extenders/ crosslinkers are liquids at 25° C. Although aliphatic —OH functional compounds, such as those just listed, are the most preferred as chain-extenders/crosslinkers, it is within the scope of the invention to employ certain polyamines, polyamine derivatives, and/or polyphenols. Examples of suitable amines known in the art include diisopropanolamine, diethanolamine, and 3,5-diethyl-2,4-diaminotoluene, 3,5-diethyl-2,6-diaminotoluene, mixtures of these, and the like. Examples of suitable isocyanate reactive amine derivatives include certain imino-functional compounds such as those described in European Patent Application Nos. 284, 253 and 359,456 and certain enamino-functional compounds such as those described in European Patent Application No. 359,456 having 2 or more isocyanate-reactive groups per molecule. Reactive amines, especially aliphatic primary amines, are less preferred due to their extremely high reactivity with polyisocyanates, but may optionally be used if desired in minor amounts.

It is also within the scope of the invention, albeit less preferred, to include within the polyol composition minor amounts of other types of isocyanate reactive species that may not conform to the types described hereinabove.

The term "chain extender" is used in the art to refer to difunctional low molecular weight isocyanate reactive species, whereas the term "crosslinker" is limited to low molecular weight isocyanate reactive species having a functionality of 3 or more.

In one embodiment, a preferred isocyanate reactive composition comprises a mixture of (a) about 0 to 20% by weight of at least one polyol having a molecular weight of 1500 or greater and a functionality of 2 to 4, (b) about 60 to 100% by weight of at least one polyol having a molecular weight between 250 and 750 and a functionality of about 3 to about 4, most preferably about 3, and (c) about 2 to about 30% by weight of a least one polyol having a functionality of about 2 to about 3 and a molecular weight of less than 200, more preferably less than 150. The weights of (a)+(b)+(c) total 100% of the isocyanate reactive composition in this preferred isocyanate reactive composition for two component mixing activated pultrusion. All the polyol species in this preferred mixed isocyanate reactive composition contain essentially all primary and/or secondary aliphatically bound organic —OH groups.

In another embodiment, the preferred isocyanate reactive composition comprises a total of at least 10% by weight, relative to the total weight of the isocyanate reactive composition, of at least one hydrophobic polyol selected from the group consisting of hydrocarbon backbone polyols of number averaged molecular weight greater than 500, fatty ester polyols of number averaged molecular weight greater than 500, and fatty polyester polyols of number averaged molecular weight greater than 500. A particularly preferred class of the fatty polyester polyols are those having number averaged functionalities of organically bound isocyanate-reactive hydroxyl groups of greater than 2. An especially preferred, but non-limiting, example of this class of fatty polyester polyols is castor oil. All the polyol species in these preferred isocyanate reactive compositions, according to this embodiment, contain essentially all primary and/or secondary aliphatically bound organic —OH groups. Fatty ester (and fatty polyester) polyols are defined further, in greater detail, herein.

In yet another embodiment, the polyisocyanate composition may contain isocyanate-terminated prepolymers of one or more of the hydrophobic polyols cited hereinabove. In the more preferred modes of this embodiment, the polyisocyanate composition comprises a total of at least 5% by weight, relative to the total weight of said polyisocyanate composition, of the at least one isocyanate terminated prepolymer of a hydrophobic polyol. In the most preferred modes of this prepolymer embodiment, the polyisocyanate composition additionally contains some unreacted monomeric polyisocyanate species. Polyisocyanate compositions comprising isocyanate terminated prepolymers of castor oil are especially preferred.

The incorporation of hydrophobic polyols, as listed above, into either the isocyanate reactive composition, the polyisocyanate composition (as isocyanate terminated prepolymers), or both has the effect of reducing or eliminating unwanted foaming during processing of the reaction system into composite articles.

It is to be understood unless otherwise stated that all functionalities, molecular weights, and equivalent weights described herein with respect to polymeric materials are number averaged, and that all functionalities, molecular weights, and equivalent weights described with respect to pure compounds are absolute.

Some preferred types of polyols include the polyether polyols and the polyester polyols. Suitable polyether polyols that can be employed in the reaction systems of the invention include those that are prepared by reacting an alkylene oxide, a halogen substituted or aromatic substituted alkylene oxide or mixtures thereof, with an active hydrogen containing initiator compound.

Suitable oxides include for example ethylene oxide, propylene oxide, 1,2-butylene oxide, styrene oxide, epichlorohydrin, epibromohydrin, mixtures thereof, and the like. Propylene oxide and ethylene oxide are particularly preferred alkylene oxides.

Suitable initiator compounds include water, ethylene glycol, propylene glycol, butane diols, hexanediols, glycerine, trimethylolpropane, trimethylolethane, pentaerythritol, hexanetriols, sucrose, hydroquinone, resorcinol, catechol, bisphenols, novolac resins, phosphoric acid, and mixtures of these.

Further examples of suitable initiators include ammonia, ethylenediamine, diaminopropanes, diaminobutanes, diaminopentanes, diaminohexanes, diethylenetriamine, triethylenetetramine, tetraethylenepentamine, pentamethylenehexamine, ethanolamine, aminoethylethanolamine, aniline, 2,4-toluenediamine, 2,6-toluenediamine, 2,4'-diaminodiphenylmethane, 4,4'-diaminodiphenylmethane, 1,3-phenylenediamine, 1,4-phenylenediamine, naphthylene-1,5-diamine, triphenylmethane-4,4',4"-tramine, 4,4'-di-(methylamino)-diphenylmethane, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diamiodiphenylmethane, and amine aldehyde condensation products such as the crude polyphenylpolymethylene polyamine mixtures produced from aniline and formaldehyde, and mixtures thereof.

Suitable polyester polyols include, for example, those prepared by reacting a polycarboxylic acid or anhydride with a polyhydric alcohol. The polycarboxylic acids may be aliphatic, cycloaliphatic, araliphatic, aromatic, and/or heterocyclic and may be substituted (e.g. with halogen atoms) and/or unsaturated. Examples of suitable carboxylic acids and anhydrides include succinic acid; adipic acid; suberic acid; azelaic acid; sebacic acid; pthalic acid; isophthalic acid; terephthalic acid; trimellitic acid; phthalic anhydride; tetrahydrophthalic anhydride; hexahydrophthalic anhydride; tetrachlorophthalic anhydride; endomethylene tetrahydrophthalic anhydride; glutaric acid anhydride; maleic acid; maleic anhydride; fumaric acid; dimeric and trimeric fatty acids, such as those obtained from oleic acid, which may be in admixture with monomeric fatty acids. Simple esters of polycarboxylic acids may also be used in preparing polyester polyols. For example, terephthalic acid dimethyl ester, terephthalic acid bis glycol esters, and mixtures of these. Examples of polyhydric alcohols suitable for use in preparing polyester polyols include ethylene glycol; 1,3-, 1,4-, 1,2-, and 2,3-butanediols; 1,6-hexanediol; 1,8-octanediol; neopentyl glycol; cyclohexane dimethanol (1,4-bis-hydroxymethyl cyclohexane); 2-methyl-1,3-propanediol; glycerol; mannitiol; sorbitol; methylglucoside; diethylene glycol; trimethylolpropane; 1,2,6-hexanetriol; 1,2,4-butanetriol; trimethylolethane; pentaerythritol; triethylene glycol; tetraethylene glycol; polyethylene glycols; dipropylene glycol; tripropylene glycol; polypropylene glycols; dibutylene glycol; polybutylene glycols; mixtures of these; and the like. The polyester polyols may optionally contain some terminal carboxy groups although preferably they are fully hydroxyl terminated. It is also possible to use polyesters derived from lactones such as caprolactone; or from hydroxy carboxylic acids such as hydroxy caproic acid or hydroxyacetic acid. A particularly preferred class of polyester polyols are the fatty polyester polyols derived from natural sources, such as castor oil and the like.

A non-limiting example of a preferred isocyanate reactive polyol suitable for use in the invention is a propylene oxide adduct of glycerol having a nominal functionality of 3 and a number-averaged hydroxyl equivalent weight of 86. This predominantly secondary-OH functional triol is an example of a rigid polyol, as per the description provided hereinabove. It is commercially available from Huntsman Petrochemical Corporation as JEFFOL® G 30-650 polyol. Another preferred isocyanate reactive polyol suitable for use in the invention is a propylene oxide adduct of glycerol having a nominal functionality of 3 and a number-averaged hydroxyl equivalent weight of about 234. This predominantly secondary-OH functional triol is another example of a rigid polyol, as per the description hereinabove. This polyol is also available from Huntsman Petrochemical Corporation as JEFFOL® G 30-240 polyol. Blends of JEFFOL® G 30-650 polyol with JEFFOL® G 30-240 polyol are highly preferred. The preferred weight ratios of these two polyols in these highly preferred blends are from about 1:2 to about 2:1.

Examples of particularly preferred crosslinkers suitable for use in the isocyanate reactive composition according to the invention include glycerol, trimethylolpropane, trimethylolethane, triisopropanolamine, and mixtures of these. Glycerol is especially preferred.

Examples of particularly preferred chain extenders suitable for use in the isocyanate reactive composition include ethylene glycol, diethylene glycol, triethylene glycol, propylene glycol, dipropylene glycol, tripropylene glycol, and mixtures of these. Dipropylene glycol, diethylene glycol, and mixtures of these two glycols are especially preferred. Combinations of both chain extenders and crosslinkers may, if desired, be used in the same active hydrogen composition.

Examples of preferred optional flexible polyols that may be used in the active hydrogen compositions include polyether polyols of molecular weight 2000 or greater. An example of a preferred flexible polyether polyol suitable for use is JEFFOL® G 31-55 polyol, which is a nominal polyether triol commercially available from Huntsman International LLC. JEFFOL® G 31-55 polyol has an hydroxyl equivalent weight of about 1000, and is prepared from a combination of propylene oxide and ethylene oxide. An example of another preferred flexible polyol that may be used in the polyol compositions suitable for the invention is JEFFOL® (G 31-35 polyol. This polyol, which is also prepared from propylene oxide and ethylene oxide, is a nominal polyether triol commercially available from Huntsman International LLC. JEFFOL® G 31-35 polyol has a hydroxyl equivalent weight of about 1600. A preferred class of flexible polyols contain predominantly primary —OH groups. The flexible polyols are preferably used at levels of 20% by weight or less of the total polyol blend composition, but may be used at higher levels if desired. It is within the scope of the invention to produce relatively flexible pultruded composites by using predominantly flexible polyols in the polyol composition. However, it is much more typical to produce rigid pultruded composites by using predominantly or exclusively rigid polyols, or combinations of rigid polyols with chain extenders and/or crosslinkers, in the polyol composition.

Other examples of rigid polyols suitable for use include rigid polyether polyols produced from an initiator composition that comprises one or more sugars. A specific example of a suitable rigid polyol of this type is JEFFOL® SD-441 polyol, which is commercially available from Huntsman International LLC. JEFFOL® SD-441 polyol is prepared by propoxylation of a mixture of sucrose and a glycol, and has a number averaged equivalent weight of about 128.

The term "nominal functionality" applied to polyols, as used in the context of this invention, denotes the expected functionality of the polyol based upon the raw materials used in its synthesis. The nominal functionality may differ slightly form actual functionality, but the difference may usually be ignored in the context of this invention. The nominal functionality of a polyoxyalkylene polyether polyol is the functionality of the initiator. This is particularly true for polyether polyols, which are based predominantly on EO and/or PO (such as, for example, the JEFFOL® G 30-650 polyol, described above). The nominal functionality of a pure compound is, of course, the same as its absolute functionality. If a mixed initiator is used, then the nominal functionality of the polyol is the number averaged functionality of the mixed initiator.

An especially preferred class of ester-group-containing polyols for use in the isocyanate reactive composition are the fatty ester (and fatty polyester) polyols. Fatty ester (and fatty polyester) polyols comprise at least one alkyl or alkenyl (hydrocarbon) side chain of from 4 to about 50 carbon atoms, preferably 5 to 25 carbon atoms, more preferably 6 to 20 carbon atoms, and most preferably 6 to less than 15 carbon atoms. The alkyl side chains are the more preferred. The fatty ester (and fatty polyester) polyols also comprise at least two primary or secondary aliphatic —OH groups per molecule and preferably greater than 2 up to 4 such —OH groups. The fatty ester polyols contain one carboxylic ester linkages per molecule. The fatty polyester polyols contain at least two carboxylic ester linkages per molecule. The fatty polyester polyols are more preferred. Preferred examples of fatty polyester polyols are those that contain at least one triglyceride structure and are liquid at 25° C. The fatty ester (and fatty polyester) polyols should preferably be free of aromatic rings, although it would be within the scope of the invention to use fatty ester (and fatty polyester) polyols that contain such rings. The fatty (poly) ester polyol may optionally contain ether linkages. A particularly preferred but non-limiting example of a triglyceride based fatty polyester polyol is castor oil. Mixtures of different fatty (poly)ester polyols may be used if desired. The fatty (poly)ester polyol may be used by itself, but is preferably used in combination with at least one other type of polyol. The fatty (poly)ester polyol is most preferably used in combination with one or more polyether polyols. A preferred range of weight ratios of fatty (poly)ester polyols to polyether polyols, in the isocyanate reactive composition, is from about 1:9 to about 9:1, and more preferably from 1:4 to 4:1. The fatty (poly)ester polyols have the desired effect of reducing foaming of the resin system during processing and curing. The fatty (poly)ester polyols, and castor oil in particular, appear surprisingly more effective at reducing foaming than conventional drying agents (such as molecular sieves) or conventional defoaming agents (such as silicone based antifoam additives). Although not wishing to be bound by theory, it is believed that the beneficial effects of the fatty (poly)ester polyols in reducing foaming is due to their hydrophobic nature. Other hydrophobic polyols, and/or additives, that might be exploited for this beneficial (antifoaming) effect include hydrocarbon backbone polyols such as the polybutadiene-based polyols, polyisoprene based polyols; hydrogenation products thereof; as well as simple aromatic or aliphatic oils. The optional, but preferred, hydrophobic polyols may also be incorporated into the polyisocyanate. It is, for example, possible to include prepolymers of fatty (poly)ester or polybutadiene polyols into the polyisocyanate.

The isocyanate reactive composition is the predominant isocyanate reactive material (other than the organic polyisocyanate itself) in the mixing activated chemical formulation used in the invention. This isocyanate reactive composition is, most preferably, a polyol or a blend of polyols. Preferably, this isocyanate reactive composition constitutes at least 90% by weight, more preferably at least 95% by weight, and most preferably at least 98% by weight of the combined isocyanate reactive species (other than the organic polyisocyanate itself) present in the chemical formulation used in the present invention. Preferably, non-active hydrogen functional isocyanate-reactive resins, such as epoxy resins, are substantially absent from the chemical formulation. By "substantially free" it is meant that the reaction mixture contains less than 10% by weight of all such non-active-hydrogen functional isocyanate-reactive resins combined, relative to the total weight of the reaction mixture (including all optional additives that may be present). More preferably, the reaction mixture contains less than 5% by weight of all such species combined, relative to the total weight of the reaction system. Still more preferably, the reaction mixture contains less than 2% by weight of such species, even more preferably less than 1%, most preferably less than 0.5%, and ideally less than 0.1%, relative to the total weight of the reaction mixture at the point of mixing.

In an alternate embodiment, the isocyanate reactive composition may be admixed with minor amounts of water by weight. The water, when used, functions as a foaming agent. In the more preferred embodiments, the chemical formulation used in the process (including the isocyanate reactive composition polyisocyanate composition and any optional additives that may be present) is essentially free of water, or any other foam generating species. Preferably, the chemical formulation (including the isocyanate reactive composition polyisocyanate composition and any optional additives that may be present) contains less than 0.2% by weight of water or other foam generating species, relative to the total formulation weight. Still more preferably, this chemical formulation contains less than 0.1% by weight, and yet more preferably less than 0.05% by weight of water or other foam generating species, relative to the total formulation weight. Ideally, the formulation should be devoid of water and other foam generating species. The phrase "foam generating species" is understood to encompass both chemical blowing agents, which produce a volatile blowing agent under the conditions of processing by means of a chemical reaction, as well as physical blowing agents (i.e. entrained atmospheric gases, or volatile organic or inorganic compounds that simply boil under the conditions of processing). The fiber reinforced pultruded composite articles made from the reaction system and according to the process of the invention are most preferably solid, and not foamed or cellular.

The polyisocyanate composition preferably consists of organic polyisocyanates having a number averaged isocyanate (—NCO) functionality of from at least 1.8 to about 4.0. In practicing the more preferred embodiments, the number averaged isocyanate functionality of the polyisocyanate composition is preferably from 2.0 to about 3.0, more preferably from 2.3 to 2.9.

The polyisocyanate composition preferably has a free isocyanate group content (—NCO content) in the range of from 5% to 50% by weight, but more preferably in the range of from 7% to 45%, still more preferably in the range of from 8% to 40%, yet more preferably in the range of from 9% to 35%, and most preferably in the range of from 10% to 33.6% by weight.

The expression "organic polyisocyanate" will be understood to encompass isocyanate molecular species having a plurality of organically bound free isocyanate (—NCO) groups. This definition includes organic diisocyanates, triisocyanates, higher functionality polyisocyanates, and mixtures thereof.

The polyisocyanates that may be used in the preferred embodiments of present invention include any of the aliphatic, cycloaliphatic, araliphatic, or aromatic polyisocyanates known to those skilled in the art. Especially preferred are those polyisocyanates that are liquid at 25° C. Examples of suitable polyisocyanates include 1,6-hexamethylenediisocyanate, isophorone diisocyanate, 1,4-cyclohexane diisocyanate, 4,4'-dicyclohexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate (4,4'-MDI), 2,4'-diphenylmethane diisocyanate (2,4'-MDI), polymethylene polyphenylene polyisocyanates (crude, or polymeric, MDI), and 1,5-naphthalene diisocyanate. Mixtures of these polyisocyanates can also be used. Moreover, isocyanate-functional polyisocyanate variants, for example, polyisocyanates that have been modified by the introduction of urethane, allophanate, urea, biuret, carbodiimide, uretonimine, isocyanurate, and/or oxazolidone residues can also be used.

In general, aromatic polyisocyanates are more preferred. The most preferred aromatic polyisocyanates are 4,4'-MDI, 2,4'-MDI, polymeric MDI, MDI variants (defined to encompass isocyanate terminated prepolymers), and mixtures of these. This most preferred class of aromatic polyisocyanates will be collectively referred to as the "MDI series" of polyisocyanates.

Isocyanate terminated prepolymers may optionally be employed. Such prepolymers are generally prepared by reacting a molar excess of polymeric or pure polyisocyanate with one or more polyols. The polyols may include aminated polyols, imine or enamine modified polyols, polyether polyols, polyester polyols or polyamines. Pseudoprepolymers (also known as semiprepolymers or quasiprepolymers), that are mixtures of an isocyanate terminated prepolymer and one or more monomeric polyisocyanates, may also be used. The use of prepolymers and especially pseudoprepolymers is one preferred method for modifying the mechanical properties of the matrix resin. The use of prepolymers and pseudoprepolymers is also a useful technique for control of the weight ratios of the reactive components during mixing activated two-component pultrusion processing.

Although it is within the scope of the invention to incorporate polyisocyanates that are fully or partially blocked, it is much more preferable not to use any blocked isocyanate species. Free isocyanate (—NCO) groups are strongly preferred. Consequently, the polyisocyanate should be essentially free of blocked isocyanate groups.

Commercially available polyisocyanates useful in the preferred two-component isocyanate-based pultrusion process include the RUBINATE® brand polymeric isocyanates available from Huntsman International LLC. A specific example of a preferred polyisocyanate composition particularly suitable for use in the invention is RUBINATE® 8700 polyisocyanate. This liquid isocyanate is of the polymeric MDI type and has a free isocyanate (—NCO) group content of 31.5% by weight and a number averaged isocyanate group functionality of 2.7. This polyisocyanate is commercially available from Huntsman International LLC. Another specific example of a preferred polyisocyanate composition suitable for use in certain embodiments of the invention is RUBINATE® 1790 polyisocyanate. This product, which is commercially available from Huntsman International LLC, is a urethane modified pure 4,4'-MDI product that has a number averaged isocyanate group functionality of about 2.00 and has a free isocyanate (—NCO) group content of about 23% by weight.

The reaction mixture may optionally contain a catalyst for one or more of the polymer forming reactions of polyisocyanates. In preferred embodiments, the reaction mixture contains at least one catalyst. The catalyst(s), when used, are preferably introduced into the reaction mixture by pre-mixing with the isocyanate reactive composition (i.e. the polyol blend).

Catalysts for the polymer forming reactions of organic polyisocyanates are well known. The optional catalyst package may consist of a single catalyst or a mixture of two or more catalysts. Some preferred catalysts are selected from the group consisting of tertiary amines, tertiary amine acid salts, organic metal salts, covalently bound organometallic compounds, and combinations of these. Examples of preferred tertiary amine catalysts include triethylenediamine, N,N-dimethyl cyclohexylamine, bis-(dimethylamino)-diethyl ether, N-ethyl morpholine, N,N,N',N',N"-pentamethyl diethylenetriamine, N,N-dimethyl aminopropylamine, N-benzyl dimethylamine, and aliphatic tertiary amine-containing amides of carboxylic acids, such as the amides of N,N-dimethyl aminopropylamine with stearic acid, oleic acid, hydroxystearic acid, and dihydroxylstearic acid. Commercially available tertiary amine catalysts include the JEFFCAT® brand catalysts from Huntsman International LLC and the POLYCAT® and the DABCO® amine catalysts, both available form Air Products and Chemicals Inc.

Examples of suitable tertiary amine acid salt catalysts include those prepared by the at least partial neutralization of formic acid, acetic acid, 2-ethyl hexanoic acid, oleic acid, or oligomerized oleic acid with a tertiary amine such as triethylenediamine, triethanolamine, triisopropanolamine, N-methyl diethanolamine, N,N-dimethyl ethanolamine, mixtures of these amines, or the like. These amine salt catalysts are sometimes referred to as "blocked amine catalysts", owing to delayed onset of catalytic activity that provides for improved convenience of resin application.

Examples of preferred organic metal salts for use as catalysts include potassium 2-ethyl hexanoate (potassium "octoate"), potassium oleate, potassium acetate, potassium hydroxide, bismuth octoate, zinc neodecanoate, dibutyltin dilaurate, dibutyltin diacetate, and dibutyltin dioleate, and other organotin carboxylate catalysts. A specific example of a particularly preferred organotin carboxylate and amine based (mixed) catalyst composition is DABCO® DC-2 catalyst, which is commercially available from Air Products and Chemicals, Inc.

Other metal-based catalysts, which are suitable for use in the invention, are zinc carboxylates, such as zinc stearate and zinc neodecanoate, and bismuth carboxylates. The organozinc type and the organobismuth type catalyst additives have been found to be particularly valuable for preventing or substantially reducing unwanted foaming, during the processing of the reaction system into composite articles. Combinations of organozinc type and organobismuth type catalysts are particularly (surprisingly) effective in this regard! Further examples of useful catalysts suitable for use in the invention include amido amine compounds derived from the amidization reaction of N,N-dimethyl propanedimine with fatty carboxylic acids. A specific example of such a catalyst is BUSPERSE 47 catalyst from Buckman Laboratories.

Mixtures of tertiary amine, amine acid salt, organometallic, and/or metal salt catalysts may be used. The use of mixed catalysts is well known to those skilled in the polymer forming chemistry of polyisocyanates and polyfunctional active hydrogen resins. It is sometimes desirable to include in the mixing activated chemical formulation one or more catalysts for the trimerization of isocyanate groups. Preferred examples of these include the alkali metal salts of carboxylic acids. Some specific examples of isocyanate trimerization (isocyanurate) catalysts include potassium 2-ethyl hexanoate, potassium oleate, potassium acetate, and potassium hydroxide. These are also effective for the catalysis of the reaction of polyisocyanates with active hydrogen compositions such as polyols.

The optional catalysts, regardless of their specific structure or function in the formulation, should preferably be non-volatile species. The more preferred catalysts therefore are those having boiling points above 200° C. (at 1 atmosphere pressure), still more preferably above 250° C., and most preferably above 260° C. (at 1 atmosphere pressure). Another preferred group of catalysts for use in the present invention are organometallic compounds of nickel, especially nickel acetylaceonate, and potassium salts of carboxylic acids, especially potassium 2-ethylhexanoate, and combinations of organotin carboxylate catalysts with organometallic compounds of nickel. Combinations of the preferred catalyst types may of course be used if desired. The levels of the preferred catalysts required to achieve the needed reactivity profile for pultrusion processing will vary with the composition of the formulation and must be optimized for each reaction system (formulation). Such optimization would be well understood by persons of ordinary skill in the art of polyisocyanate-based polymer chemistry. The catalysts preferably have at least some degree of solubility in the polyol blends used, and are most preferably fully soluble in the polyol blend at the use levels required.

The chemical precursors used to form the reaction mixture may contain other optional additives if desired. The optional additives are typically added to the isocyanate-reactive material (typically, this is a polyol blend) prior to processing, although it is within the scope of the invention to premix all or any part of the optional additives package with the polyisocyanate composition under the proviso that it does cause the polyisocyanate to self-react or otherwise interfere with pultrusion processing of the reaction system.

Examples of additional optional additives include particulate or short fiber fillers, internal mold release agents, fire retardants, smoke suppressants, dyes, pigments, antistatic agents, antioxidants, UV stabilizers, minor amounts of viscosity reducing inert diluents (preferably those boiling above 180° C. at 760 mmHg pressure, most preferably those boiling above 260° C. at 760 mmHg pressure), combinations of these, and any other known additives from the art of polyisocyanate based polymer chemistry. In an alternative embodiment, the additives or portions thereof may be provided to the fibers, such as by coating the fibers with the additive.

Suitable fillers can include, for example, calcium carbonate, barium sulfate, clays, aluminium trihydrate, antimony oxide, milled glass fibers, wollastonite, talc, mica, flaked glass, silica, titanium dioxide, molecular sieves, micronized polyethylene, combinations of these, and the like.

Internal mold release additives are highly preferred in pultrusion of mixing activated isocyanate based resins systems in order to prevent sticking or buildup in the die. Suitable internal mold release agents may include, for example, fatty amides such as erucamide or stearamide, fatty acids such a oleic acid, oleic acid amides, fatty esters such as LOXIOL G71S inert polyester (from Henkel), carnuba wax, beeswax (natural esters), butyl stearate, octyl stearate, ethylene glycol monostearate, ethylene glycol distearate, glycerin di-oleate, glycerin tri-oleate, and esters of polycarboxylic acids with long chain aliphatic monovalent alcohols such as dioctyl sebacate, mixtures of (a) mixed esters of aliphatic polyols, dicarboxylic acids and long-chained aliphatic monocarboxylic acids, and (b) esters of the groups: (1) esters of dicarboxylic acids and long-chained aliphatic monofunctional alcohols, (2) esters of long-chained aliphatic monofunctional alcohols and long-chained aliphatic monofunctional carboxylic acids, (3) complete or partial esters of aliphatic polyols and long-chained aliphatic monocarboxylic acids, silicones such as TEGO® IMR 412T silicone (from Goldschmidt), KEMESTER® 5721 ester (a fatty acid ester product from Witco Corporation), fatty acid metal carboxylates such as zinc stearate and calcium stearate, waxes such as montan wax and chlorinated waxes, fluorine containing compounds such as polytetrafluoroethylene, fatty alkyl phosphates (both acidic and non acidic types such as ZELEC® UN, ZELEC® AN, ZELEC® MR, ZELEC® VM-, ZELEC® UN, ZELEC® LA-1, and ZELEC® LA-2 phosphates, which are all commercially available from Stepan Chemical Company), chlorinated-alkyl phosphates; hydrocarbon oils, combinations of these, and the like.

Other preferred optional additives for use in pultrusion processing of mixing activated isocyanate-based polymer systems include moisture scavengers, such as molecular sieves; defoamers, such as polydimethylsiloxanes; coupling agents, such as the mono-oxirane or organo-amine functional trialkoxysilanes; combinations of these and the like. The coupling agents are particularly preferred for improving the bonding of the matrix resin to the fiber reinforcement. Fine particulate fillers, such as clays and fine silicas, are often used at thixotropic additives. Such particulate fillers may also serve as extenders to reduce resin usage.

Fire retardants are sometimes necessary as additives in pultruded composites. Examples of preferred fire retardant categories include but are not limited to triaryl phosphates; trialkyl phophates, especially those bearing halogens; melamine (as filler); melamine resins (in minor amounts);

halogenated paraffins; combinations of these; and the like. Other optional additives that may be used will be apparent to those skilled in the art.

In preferred embodiments, the ratio of the combined weight of all the optional additives in the formulation to the combined weight of the isocyanate reactive composition and polyisocyanate composition is less than 1, more preferably less than 0.5, still more preferably less than 0.25, yet more preferably less than 0.1, and most preferably less than 0.07.

The stoichiometry of mixing activated isocyanate-based polymer forming formulations, containing an organic polyisocyanate and a polyfunctional isocyanate reactive resin is often expressed by a quantity known in the art as the Index. The Index of such a mixing activated formulation is simply the ratio of the total number of reactive isocyanate (—NCO) groups present to the total number of isocyanate-reactive groups (that can react with the isocyanate under the conditions employed in the process). This quantity is often multiplied by 100 and expressed as a percent. Typical index values in the mixing activated formulations, which are suitable for use in the invention range from about 70 to about 150%, but may extend as high as about 1500% if a catalyst for the trimerization of isocyanate groups is present. A preferred range of Index values is from 90 to 110%. A still more preferred index range is from 100 to 110%. A yet more preferred index range is from 100 to 105%. Another preferred range of Index values is from 200 to 700%, when a catalyst for the trimerization of isocyanate groups is present.

A long fiber based reinforcing material is necessary to provide both mechanical strength to the pultruded composite, and as the means for transmitting the pulling force in the process. The fibers should be at least long enough to pass though both the impregnation and curing dies and attach to a source of tension. The fibrous reinforcing structure may be made of any fibrous material or materials that can provide long fibers, which are capable of being at least partially wetted by the reaction mixture during impregnation. The fibrous reinforcing structure may consist of single strands, braided strands, woven or non-woven mat structures, combinations of these, or the like. Mats or veils made of long fibers may be used, in single ply or multi-ply structures. Suitable fibrous materials are those known in the pultrusion art, including, but not limited to, glass fibers, glass mats, carbon fibers, polyester fibers, natural fibers, aramid fibers, nylon fibers, combinations of these, and the like. Particularly preferred reinforcing structures are those made from long glass fibers. In preferred embodiments, the fibers and/or fibrous reinforcing structures are formed continuously from one or more reels feeding into the pultrusion apparatus and attached to a source of pulling force at the outlet side of the curing die. The reinforcing fibers may optionally be pretreated with sizing agents or adhesion promoters known in the art.

The weight percentage of the long fiber reinforcement in the final pultruded composite articles may vary considerably, depending on the end use application intended for the composite articles. Typical reinforcement loadings are from about 30 to 95% by weight, but more typically from 40 to 90% by weight of the final composite. Preferred reinforcement loadings are in the range of 60 to 90% by weight, more preferably 70 to 90% by weight of the final composite.

It is within the broader scope of the invention to use mixing activated reaction systems comprising more than two components. However, two component mixing activated systems are most preferred.

In the most preferred embodiments, the polyisocyanate component and the isocyanate reactive component are the only components that are fed into the impregnation die of the pultrusion process. The polyisocyanate component contains the polyisocyanate composition and any optional additives that have been premixed therewith. The isocyanate reactive component contains the isocyanate reactive composition and any optional additives that have been premixed therewith.

The impregnation die must provide for adequate mixing of the reactive components and adequate impregnation of the fibrous reinforcing material. The impregnation die may preferably be fitted with a mixing apparatus, such as a static mixer, which provides for mixing of the reactive components before the resulting reaction mixture is used to impregnate the fibrous reinforcing structure. Other types of optional mixing devices may be used. They may include, but are not limited to, high-pressure impingement mixing devices or low pressure dynamic mixers such as rotating paddles. In some cases, adequate mixing is provided in the impregnation die itself, without any additional mixing apparatus.

In the most preferred embodiments, the optional additives, including any catalysts, are pre-mixed with the isocyanate reactive composition prior to mixing of the latter with the polyisocyanate composition. However, it is to be understood that the optional additives that are not themselves polyfunctional isocyanate reactive materials are to be considered (counted) as entities separate from the isocyanate reactive composition, even when mixed therewith. Likewise, if the optional additives, or any part thereof, are premixed with the polyisocyanate composition, these are to be considered as entities separate from the polyisocyanate composition, except in the case where they are themselves polyfunctional isocyanate species.

In an especially preferred embodiment, the two component chemical formulation (reaction system) that is precursor to the reaction mixture is formulated to provide for mixing at a component weight ratio of about 1:1.

The pultrusion apparatus preferably contains at least one impregnation die and at least one curing die. The curing die operates at a higher temperature than the impregnation die. The pultrusion apparatus may optionally contain a plurality of curing dies, or zones. Different curing zones may be set at different temperatures, if desired, but all the zones of the curing die should be higher in temperature than the impregnation die. The pultrusion apparatus may optionally contain a plurality of impregnation dies. Preferably, there is just one impregnation die, and this preferably is situated immediately prior to the first curing die (or zone). The impregnation die is set at a temperature that provides for some degree of reaction (polymerization) between the polyisocyanate and the polyisocyanate-reactive ingredients in the reaction mixture before the fibrous reinforcing structure, which has been at least partially impregnated with said reaction mixture, enters the first curing die (or zone). It is highly preferable that the reaction mixture retains some degree of flowability (liquidity) until it enters the first curing die (or zone).

It is highly preferred that the wetting of the fibrous reinforcing structure be complete and that there be no dry spots, which would lead to surface defects or voids in the cured composite. Further details about preferred mixing activated isocyanate-based pultrusion processing methods and apparatus are provided in WO 00/29459.

In a highly preferred embodiment, the reaction system (used to prepare the reaction mixture) is substantially free of organic species, other than carbon dioxide, boiling less than 200° C. at 1 atmosphere pressure. In a still more highly preferred embodiment, the reaction system is substantially free of organic species, other than carbon dioxide, boiling less than 250° C. at 1 atmosphere pressure. In an even more highly preferred embodiment, the reaction system is substantially free of organic species, other than carbon dioxide, boiling less than 260° C. at 1 atmosphere pressure.

In yet another highly preferred embodiment, the reaction system is substantially free of organic species, other than carbon dioxide, having a vapor pressure greater than or equal to 0.1 mmHg at 25° C. In yet another highly preferred embodiment, the reaction system is substantially free of any organic species having a vapor pressure greater than or equal to 0.1 mmHg at 25° C. By "substantially free" it is meant that the reaction system contains less than 10% by weight of all such organic species combined, relative to the total weight of the reaction system (including all optional additives that may be present). More preferably, the reaction system contains less than 5% by weight of all such organic species combined, relative to the total weight of the reaction system. Still more preferably, the reaction system contains less than 2% by weight of such organic species, even more preferably less than 1%, most preferably less than 0.5%, and ideally less than 0.1%, relative to the total weight of the reaction system. The reaction system contains less than 0.1% by weight, more preferably less than 0.01% by weight, and most preferably 0%, of styrene or methyl methacrylate.

It has surprisingly been found that a new class of mixing activated isocyanate-based two component liquid reaction systems for pultrusion have resulted in substantially improved processing. Higher line speeds, better processing efficiency, and improved part quality have been achieved by using these new pultrusion resin formulations. The reaction systems are characterized by certain gel time ranges under a dry atmosphere. These reaction systems are thermosetting systems, which preferably cure by forming a covalently crosslinked network structure. The reaction mixture, which initially contains both free alcoholic —OH groups and free isocyanate (—NCO) groups, has a gel time of greater than 768 seconds at 25° C. and a gel time of not greater than 120 seconds at 175° C.

In preferred embodiments, the reaction mixture has a gel time at 25° C. of greater than 900 seconds. In more preferred embodiments, the reaction mixture has a gel time at 25° C. of 1000 seconds or more. In still more highly preferred embodiments, the reaction mixture has a gel time at 25° C. in the range of from 1000 seconds to 4000 seconds. In yet more highly preferred embodiments, the reaction mixture has a gel time at 25° C. in the range of from 1000 seconds to 3900 seconds, and a gel time at 175° C. of less than 120 seconds.

In another preferred embodiment, the reaction mixture has a gel time at 25° C. of greater than 1000 seconds but less than 1200 seconds, and a gel time at 175° C. of less than 60 seconds. In yet another preferred embodiment, the reaction mixture has a gel time at 25° C. of from 2400 seconds to 2700 seconds, and a gel time at 175° C. of from 60 seconds to 120 seconds. In still another preferred embodiment, the reaction mixture has a gel time at 25° C. of from 3000 seconds to 3300 seconds, and a gel time at 175° C. of from 60 seconds to 120 seconds. In still another preferred embodiment, the reaction mixture has a gel time at 25° C. of from 3600 seconds to 3900 seconds, and a gel time at 175° C. of from 60 seconds to 120 seconds.

These gel time ranges are all determined on the complete formulation (with any optional additives that may be present), under mixing conditions similar to those employed in the actual pultrusion apparatus. They are measured according to the following general procedure (in the absence to the reinforcing fibers):

Procedure for Determining Reactivity Parameters (at 25° C.):

Add required weights of the fully formulated Isocyanate component (A-component) and the fully formulated Polyol component (B-component), including any optional additives, to the container used for mixing in a DAC 400 FV lab mixer. This mixer is known as a Speed Mixer and is manufactured by Hauschild Engineering. The use of this particular type of mixer minimizes entrainment of air into the liquid resin sample. The chemical components and apparatus are initially all at 25° C. Make sure there is at least 100 g of material for the mixer to function properly, but not greater than 200 g of material. The target scale of the reaction should be 120 g of material. Mixing should be performed under a dry atmosphere (i.e. dry air or dry nitrogen). The B-component is first weighed into the mixing container, followed by the A-component, at the appropriate weight ratio of the components. The mixing container is then immediately closed and inserted into the mixer.

Mix material for 25 seconds @ 2250 rpm. Start the timer as soon as you begin the mixer.

Once mixer stops, pour material into a small (approximately 125 ml) cup to obtain the reactivity.

The material is usually thick, creamy beige in color, and turns a clear brown as the mixture reacts.

To check for the gel time, lightly touch a wood tongue depressor (or, alternatively, a stainless steel spatula) to the surface of the material. The material has gelled when a string is pulled from the top surface. A string resembles a fine, spun web. Keep in mind that touching a wood stick to the surface may cause foaming.

A hard time may then be obtained. A hard time can be noted when the tongue depressor hits a hard, or cured, spot on the surface of the material.

Procedure for Determining Reactivity Parameters on a Hot Plate (175° C.):

As mentioned above, after the material has been poured into the ~125 ml cup, the reactivity can be checked on a hot plate while the reaction is taking place. The procedure, to this point, is exactly as described above (for 25° C.).

The reactivity should be taken at 175° C. Using a temperature probe, find a spot on the plate that is 175° C.

Use a flat steel washer and a syringe to get consistent results. The washer should have an external diameter of 2.25 in., and internal diameter (inner ring diameter) of 15/16 in., and a thickness of 1/8 in. Place the center of the washer ring over the spot that is 175° C. Leave it there for 5 min., and then check that the temperature of the center (hole) is 175° C. This should be sufficient time for the temperature of the washer to equilibrate to that of the hot plate (175° C.). Have a second stop watch ready to note the reactivity.

Draw 2 cc of reaction mixture from the cup into the syringe. When the timer that is being used to get the 25° C. gel time shows 3 minutes, simultaneously start the second stop watch as the material is dispensed into the middle of the ring. The material should fill the circle right to the rim.

There are three times that should be noted:

1. Cream time—when the full circle of material has turned from opaque to clear.
2. Gel time—when the material produces a fine string from the surface when the wooden tongue depressor is pulled away. Take the gel time from the center of the circle.
3. Hard time—when the material has fully cured.

The material, once cured, should pop right out of the circle so that the washer may be reused. Scrape off any remaining residue so that the washer will continue to lie flat on the hot plate.

These mixing activated compositions disclosed herein provide a surprising combination of long open time at relatively low temperature with fast cure at relatively high temperature. The reaction mixtures formed from these compositions generally cure homogeneously and do not form separated solids prior to entering the first curing zone of the pultrusion line. This homogeneity of cure (without solids separation) is highly desirable.

The invention is further illustrated by the following non-limiting Examples.

EXAMPLES

In the Examples that follow, all percentages given are percentages by weight unless indicated otherwise. All component (A/B) ratios are weight ratios unless indicated otherwise. The B-component composition is defined for each Example. The isocyanate used in each Example is the A-component.

Glossary:
1) JEFFOL® G 30-650 polyol: Is an oxypropylated glycerol, nominal triol having an hydroxyl number of about 650, available from Huntsman International LLC.
2) JEFFOL® G 30-240 polyol: Is an oxypropylated glycerol, nominal triol having an hydroxyl number of 240, available from Huntsman International LLC.
3) JEFFOL® G 31-55 polyol: Is an oxypropylated and oxyethylated glycerol, a nominal flexible triol having an hydroxyl number of about 55. It is available from Huntsman International LLC.
4) JEFFOL® G 31-35 polyol: Is an oxypropylated and oxyethylated glycerol, a nominal flexible triol having an hydroxyl number of about 35. It is available from Huntsman International LLC.
5) JEFFOL® SD-441 polyol: Is a polyol composition obtained by oxypropylation of a mixture of sucrose and a glycol. This polyol has a number averaged hydroxyl functionality of greater than 3, and an hydroxyl value of about 440. It is available from Huntsman International LLC.
6) NIAX® LC-5615 catalyst: Is nickel acetylacetonate in a polyether carrier, available from Crompton Corporation.
7) DPG: Is dipropylene glycol.
8) DEG: Is diethylene glycol.
9) SILQUEST® A-187 silane: Is gamma-glycidoxypropyl trimethoxysilane, available from CD Witco Corporation. This product is suitable for use as a coupling agent for the purpose of improving the bonding of the matrix resin to glass fiber reinforcement.
10) MOLD WIZ® INT PS 125 internal mold release additive: Is a proprietary internal mold release additive, available form Axel Plastics Research Company.
11) CLAY ASP 400 filler: Is a clay based particulate filler, available from Engelhard Co.
12) DABCO® K-15 catalyst: Is potassium 2-ethyl hexanoate, in diethylene glycol carrier. It is available from Air Products and Chemicals Corporation.
13) DABCO® DC-2 catalyst: Is a catalyst blend, containing organotin and tertiary amine catalysts dissolved in a carrier. It is available from Air Products and Chemicals Corporation.
14) SAG®-47 surfactant: Is a polydimethylsiloxane based defoaming surfactant, available from Union Carbide Corporation. This product is suitable from use as an antifoaming additive.
15) SUPRASEC® 9700 polyisocyanate: Is a liquid polymeric MDI product having a free isocyanate group content of about 31.5% by weight and a number averaged isocyanate group functionality of about 2.7. This product is available from Huntsman International LLC.
16) RUBINATE® 1790 polyisocyanate: Is a liquid derivative of pure 4,4'-MDI that contains urethane groups, has a number averaged functionality of isocyanate groups of about 2.00 and an isocyanate group content of about 23% by weight. This derivative is commercially available from Huntsman International LLC.
17) Molecular Sieve: Alternatively BAYLITH® 3A sieve, BAYLITH® 4A sieve, or any mixture thereof. Both of these molecular sieve moisture scavenger products are available from Bayer Corporation.
18) TECHLUBE® BR 550 lubricant: Is a proprietary internal mold release agent containing complex complex condensation polymer of synthetic resins, glyceride and organic esters manufactured by Technick Products, Rahway N.J.
19) TERATE® 4026 polyol: Is an aromatic polyester polyol with a hydroxyl value of 213 mg KOH/gm, 2 functional and is manufactured by Kosa, Wilmington, N.C.
20) TERAFLEX® 212 polyol: Is an aromatic polyester intermediate having a hydoxyl number of <20 mg KOH/g and is manufactured by Kosa, Wilmington, N.C.
21) BYK® K 9600 additive: Is a mixture of oligomeric hydrocarbons with emulsifiers that act as viscosity reducers and pore controller in polyurethane resin system. It is manufactured by BYK—Chemie, Wallingford, Conn.
22) AXEL® INT PS 125 additive: Is proprietary complex mixture of primary, secondary fatty amines with copolymers of organic phosphate esters and fatty acids manufactured by Axel Plastics Research Laboratories, Inc. Woodside, N.Y.
23) JEFFOL® PPG-400 polyol: Is a 400 molecular weight (number average) polyoxypropylene diol, available commercially from Huntsman International LLC.
24) Molecular Sieve 4: Is a molecular sieve moisture scavenger product having a pore size of 4 Angstroms, such as BAYLITH® 4A sieve available from Bayer Corporation.
25) KRASOL® LH 2000 polyol: Is a hydroxyl terminated polybutadiene flexible polyol having a hydroxyl value of about 51. This product is available from Kaucuk, Kralupy n/V, Czech Republic.
26) JEFFOL® G 31-32 polyol: Is a flexible polyether nominal triol formed from the reaction of propylene oxide and ethylene oxide with glycerol. This polyol has a hydroxyl value of about 32 and is available from Huntsman International LLC.
27) RUBINATE® 9700 polyisocyanate: Is equivalent to SUPRASEC® 9700 polyisocyanate.
28) JEFFOL® PPG 230 polyol: Is a polyoxypropylene diol of number averaged molecular weight about 230, available from Huntsman Petrochemical Corporation.
29) JEFFOL® PPG 1000 polyol: Is a polyoxpropylene diol of number averaged molecular weight about 1000, available from Huntsman Petrochemical Corporation.
30) COSCAT® BiZn catalyst: Is a proprietary organometallic catalyst composition believed to comprise bismuth and zinc, commercially available from Cosan Chemical Corporation.

31) RUBINATE® 9433 polyisocyanate: A proprietary blend of 4,4'-MDI, 2,4'-MDI, uretonimine modified 4,4'-MDI, and urethane modified 4,4'-MDI. The blend is characterized by having a free isocyanate (—NCO) group content of 31.7% by weight and a number averaged isocyanate (—NCO) group functionality of 2.01. This liquid polyisocyanate composition is commercially available from Huntsman International LLC.

Pultrusion of Polyurethane and Polyisocyanurate Systems

Generally, pultrusion of polyurethane and polyisocyanurate systems with fiber reinforced composites is performed by supplying the isocyanate and polyol components to a mix/metering machine for delivery in a desired ratio to a mixing apparatus, preferably a static mixer, to produce a reaction mixture. The reaction mixture is supplied to an injection die where it can be used to impregnate fibers being pulled concurrently into the injection die. The resulting uncured composite is pulled through a zoned heating die, attached directly to the injection die, having a desired cross-section where it is shaped and cured. The dynamic forces needed to pull the composite through the forming die is supplied by the pulling machine. This machine typically consists of gripping devices that contact the cured composite profile (or the glass fibers therein) and give the traction necessary to pull the composite profile through the die. The machine also consists of a device that develops a force in the desired direction of pull that gives the impetus necessary to pull the composite profile continuously through the die. The resulting composite profile upon exiting the pulling machine is then cut to the desired length typically by an abrasive cut off saw.

Example 1–7 outlined below have been processed both on a lab pultrusion machine and on a production scale pultrusion line. Two types of meter/mix machines were used to supply the reaction mixture to the injection die. Liquid Control Corp., North Canton, Ohio, model RPV, manufactures the first machine. It supplies the reaction components at the desired ratio to a static mixer at a rate of approximately 2 g/s. The static mixer is equipped with 30 polypropylene elements, which combines the reactants to form a homogeneous mixture. The inside diameter of this static mixer is 8 mm and the overall length is 32.26 mm. GS Manufacturing Inc, Costa Mesa, Calif., manufactured the second meter/mix machine used. It also delivers the reaction components at the desired ratio to the same static mixer at approximately 2 g/s.

The static mixer is attached to an injection die that combines the reaction mixture with the reinforcement that is being pulled concurrently through the injection die. The injection die internal dimensions are 8 in. long by 1.5 in. wide by 0.6 in. tapering to 0.1 in. high. The injection die is attached to the curing die that has internal measurements of 26 in. long by 1.5 in. wide by 0.06 in. high. The curing die has two heated zones equipped with electrical heating coils individually controlled to maintain the desired temperatures. Sometimes curing dies with three zones are used.

The reinforcement used in the preparation of the pultruded composite were in the form of 28 fiberglass rovings supplied by Owens Corning Fiberglass Co., 366 Type 30, 4400 Tex. A pulling machine manufactured by Huntsman International LLC pulled the rovings and composite. It is a caterpillar type machine in that the grippers provide the propulsion that drives the process.

Examples 1 and 2 were processed using a reciprocating type puller manufactured by Inline Fiberglass LTD, Toronto Ontario. The same meter/mix machines and static mixer were used to make the composite profiles. Two dies were used to make the profiles. The first had inside dimensions of 40 in. long by 6 in. wide by 0.085 in. high. Electrical heating coils were used to heat three individually controlled zones. The injection die was a proprietary design and was attached to the curing die. Again, Owens Corning fiberglass, 366 Type 30, 4400 Tex was used.

The second die used had inside dimensions of 40 in. long by 18 in. wide by 0.085 in. wide. Again, the injection die was a proprietary design. The electric heating coils and zones remained constant and the same glass was used.

On-line Spray Painting of Pultruded Part

On-line spray painting of the pultruded part was optionally done during the pultrusion process. As the pultruded part was pulled outside the curing die at a pull speed of 24 inches/minute, white pigment spray paint was sprayed on top of the hot pultruded part. The temperature of the part as it was painted was in the range of 300–325° F. Spraying was done on only side of the pultruded profile. By the time it reached the puller the paint had dried. After removal from the puller the painted surface of the part did not show any scratches or defects. The part in Example 1 was painted according to this method. None of the other parts prepared in the Examples were painted on line.

Example 1

Evaluated in Laboratory and on Pultrusion Line.

| B-Component Composition | % |
| --- | --- |
| JEFFOL ® G 30–650 polyol | 33.953 |
| Glycerine | 3.773 |
| JEFFOL ® G 30–240 polyol | 54.700 |
| MOLD WIZ ® INT PS 125 | 4.244 |
| NIAX ® LC 5615 catalyst | 1.132 |
| DABCO ® DC 2 catalyst | 0.500 |
| Molecular Sieve, additive | 1.698 |
| Total | 100.0 |

A-Component Composition: SUPRASEC® 9700 Polyisocyanate.

A/B ratio: 1:1

Hand Mix Reaction Profile: @ 25° C. Gel 18–19 minutes, Hard 20–22 minutes

@ 175° C. Gel<1 minute, Hard 1 minute

Pultrusion conditions:

| | |
| --- | --- |
| Zone 1: | 250° F. |
| Zone 2 | 350° F. |
| Zone 3 | 250° F. |
| Pull Speed: | 40–78"/min |
| Pull Force: | 120–250 psi |

Pultruded product has good surface appearance with no surface defects.

Example 2

Evaluated in Laboratory and on Pultrusion Line.

| B-Component Composition | % |
|---|---|
| JEFFOL ® G 30–650 polyol | 27.701 |
| JEFFOL ® G 30–240 polyol | 41.551 |
| Glycerine | 02.770 |
| NIAX ® LC 5615 catalyst | 0.831 |
| DABCO ® DC 2 catalyst | 0.831 |
| Molecular Sieve, additive | 1.524 |
| MOLD WIZ ® INT PS 125 additive | 9.003 |
| SILQUEST ® A 187 additive | 1.039 |
| CLAY ASP 400, additive | 14.751 |
| Total | 100.00 |

NOTE: In some of the trials, Clay ASP 400 (5, 10 and 15%) was replaced by calcium carbonate (same %). Also, the sample thickness (0.09, 0.06 and 0.04) was varied and also the line speed (24–70"/min)

A-Component Composition: SUPRASEC® 9700 polyisocyanate.

A/B ratio: 1:1

Hand Mix Reaction Profile: @ 25° C. Gel 18–19 minutes, Hard 20–22 minutes

@ 175° C. Gel<1 minute, Hard 1 minute

Pultrusion conditions:

| Zone 1: | 250° F. |
|---|---|
| Zone 2 | 350° F. |
| Zone 3: | 350° F. |
| Zone 4: | 300° F. |
| Pull Speed: | 20–24"/min |

Pultruded 18" profile with this formulation.

Example 3

Evaluated in Laboratory and on Pultrusion Line.

| B-Component Composition | % |
|---|---|
| JEFFOL ® SD 441 polyol | 51.752 |
| JEFFOL ® G 31–55 polyol | 19.904 |
| JEFFOL ® G 30–240 polyol | 7.962 |
| NIAX ® LC 5615 catalyst | 0.477 |
| DABCO ® K-15 catalyst | 0.001 |
| DPG | 3.981 |
| Zinc Stearate, additive | 3.981 |
| CLAY ASP-400, additive, | 11.943 |
| Total | 100.00 |

A-Component Composition: SUPRASEC® 9700 polyisocyanate

A/B ratio: 0.73

Hand Mix Reaction Profile: @ 25° C. Gel 40–45 minutes, Hard 80–90 minutes

@ 175° C. Gel about 1 minute, Hard 2–3 minute

Pultrusion conditions:

| Zone 1: | 3750° F. |
|---|---|
| Zone 2 | 400° F. |
| Pull Speed: | 20–24"/min |
| Pull Force: | 1500–1700 lbs. |

Pultruded 1.5" profile with this formulation.

Example 4

Evaluated in Laboratory and on Pultrusion Line.

| B-Component Composition | % |
|---|---|
| JEFFOL ® G 31–35 polyol | 80.667 |
| DEG | 16.022 |
| SAG ® 47, additive | 0.300 |
| MOLD WIZ ® INT PS 125 additive | 3.001 |
| DABCO ® DC 2 catalyst | 0.010 |
| Total | 100.00 |

A-Component Composition: SUPRASEC® 9700 polyisocyanate.

A/B ratio: 0.5

Hand Mix Reaction Profile: @ 25° C. Gel 50–55 minutes, Hard 70–80 minutes

@ 175° C. Gel about 1 minute, Hard 2–3 minute.

Example 5

Evaluated in Laboratory and on Pultrusion Line.

| B-Component Composition | % |
|---|---|
| JEFFOL ® G 31–35 polyol | 80.667 |
| DEG | 16.022 |
| SAG ® 47 additive | 0.300 |
| MOLD WIZ ® INT PS 125 additive | 3.001 |
| DABCO ® DC 2, catalyst | 0.010 |
| Total | 100.00 |

A-Component Composition: RUBINATE® 1790 polyisocyanate.

A/B ratio: 0.5 [94% Index]

Hand Mix Reaction Profile: @ 25° C. Gel 60–65 minutes, Hard 80–90 minutes

@ 175° C. Gel about 1 minute, Hard 2–3 minute

Example 6

Evaluated in Laboratory and on In-House Pultrusion Line and at One of the Pultruders.

| B-Component Composition | % |
|---|---|
| JEFFOL ® G 30–650 polyol | 35.952 |
| Glycerine | 3.595 |

-continued

| B-Component Composition | % |
|---|---|
| JEFFOL ® G 30–240 polyol | 35.952 |
| DABCO ® T-45 catalyst | 0.324 |
| Motor Oil 10W30 additive | 10786 |
| LOXIOL G 71S additive | 10.786 |
| BYK ® K 9600 additive | 1.079 |
| Molecular Sieve, additive | 1.528 |
| Total | 100.0 |

A-Component Composition: SUPRASEC® 9700 polyisocyanate.

A/B ratio 1:1.18, Index 109.

Hand Mix Reaction Profile: @ 25° C. Gel 22–24 minutes, Hard 25–26 minutes

@ 175° C. Gel<1 minute, Hard 1 minute

Pultrusion conditions:

| Zone 1: | 375° F. |
|---|---|
| Zone 2 | 350° F. |
| Pull Speed: | 26–82"/min |
| Pull Force: | 350–450 lbs. |

Pultruded product has good surface appearance with no surface defects. Pultruded for more than two hours

Example 7

Polyester System

Evaluated in Laboratory and on In-House Pultrusion Line

| B-Component Composition | % |
|---|---|
| STEPANPOL ® PS 1752 polyol | 42.254 |
| Glycerine | 14.085 |
| Trichlorophenyl Phosphate, additive | 10.563 |
| TERATE ® 4026 polyol | 28.169 |
| BYK ® K 9600, additive | 0.704 |
| AXEL ® INT PS 125, additive | 4.255 |
| Total | 100.0 |

A-Component Composition: SUPRASEC® 9700 polyisocyanate

A/B ratio: 1:00, Index 114

Hand Mix Reaction Profile: @ 25° C. Gel 28–30 minutes, Hard 32–34 minutes

@ 175° C. Gel<1 minute, Hard 1 minute

Pultrusion conditions:

| Zone 1: | 375° F. |
|---|---|
| Zone 2 | 350° F. |
| Pull Speed: | 18–32"/min |
| Pull Force: | 350–450 psi |

Pultruded product has good surface appearance with no surface defects. Pultruded for more than two hours

Example 8

| B-Component Composition | % |
|---|---|
| JEFFOL ® G 31–35 polyol | 80.667 |
| DEG | 16.022 |
| SAG ® 47, additive | 0.300 |
| MOLD WIZ ® INT PS 125, additive | 3.001 |
| DABCO ® DC 2 catalyst | 0.010 |
| Total | 100.00 |

A-Component Composition: SUPRASEC® 9700 polyisocyanate

A/B ratio: 0.5

Hand Mix Reaction Profile: @ 25° C. Gel 50–55 minutes, Hard 70–80 minutes

@ 175° C. Gel about 1 minute, Hard 2–3 minute.

Example 9

Evaluated in Laboratory.

| B-Component Composition | % |
|---|---|
| JEFFOL ® G 31–35 polyol | 80.667 |
| DEG | 16.022 |
| SAG ® 47, additive | 0.300 |
| MOLD WIZ ® INT PS 125, additive | 3.001 |
| DABCO ® DC 2 catalyst | 0.010 |
| Total | 100.00 |

A-Component Composition: RUBINATE® 1790 polyisocyanate

A/B ratio: 1.0

Hand Mix Reaction Profile: @ 25° C. Gel 60–65 minutes, Hard 80–90 minutes

@ 175° C. Gel about 1 minute, Hard 2–3 minute

Example 10

Evaluated in Laboratory.

| B-Component Composition | % |
|---|---|
| JEFFOL ® SD 441 polyol | 26.940 |
| DPG | 23.570 |
| Castor Oil (Imported oil #1), polyol | 44.140 |
| MOLD WIZ ® INT PS 125 additive | 3.000 |
| Molecular Sieve °4, additive | 2.215 |
| DABCO ® DC 2 catalyst | 0.010 |
| Total | 100.00 |

A-Component Composition: RUBINATE® 9700 isocyanate
A/B ratio: 1.0 vol/vol, 1.73 wt/wt, Index 125
Hand Mix Reaction Profile: @ 25° C. Gel 31–34 minutes, Hard 36–38 minutes
@ 175° C. Gel about 1 minute, Hard 2–3 minute

Example 11

Evaluated in Laboratory.

| B-Component Composition | % |
| --- | --- |
| JEFFOL ® SD 441 polyol | 28.73 |
| DPG | 24.17 |
| KRASOL ® LBH 2000, polyol | 7.50 |
| Castor Oil (Imported oil #1), polyol | 33.90 |
| MOLD WIZ ® INT PS 125, additive | 3.00 |
| Molecular Sieve °4, additive | 2.52 |
| DABCO ® DC 2 catalyst | 0.18 |
| Total | 100.00 |

A-Component Composition: RUBINATE® 9700 isocyanate
A/B ratio: 1.0 vol/vol, 1.93 wt/wt, Index 125
Hand Mix Reaction Profile: @ 25° C. Gel 36–38 minutes, Hard 40–41 minutes
@ 175° C. Gel about 1 minute, Hard 2–3 minute

Example 12

Evaluated in Laboratory.

| B-Component Composition | % |
| --- | --- |
| JEFFOL ® G 30–650 polyol | 46.05 |
| JEFFOL ® PPG 400 polyol | 7.67 |
| JEFFOL ® G 32—32 polyol | 5.12 |
| Castor Oil (Imported oil #1), additive | 35.37 |
| TECHNIQUE ® BR 550, additive | 3.00 |
| Molecular Sieve °4, additive | 2.61 |
| DABCO ® DC 2 catalyst | 0.18 |
| Total | 100.00 |

A-Component Composition: RUBINATE® 9700 polyisocyanate
A/B ratio: 1.0 vol/vol, 1.45 wt/wt, Index 125
Hand Mix Reaction Profile: @ 25° C. Gel 36–38 minutes, Hard 40–41 minutes
@ 175° C. Gel about 1 minute, Hard 2–3 minutes.

Example 13

Evaluated in Laboratory and on In-House Pultrusion Line.

| B-Component | % |
| --- | --- |
| JEFFOL ® G 30–650 polyol | 84.37 |
| JEFFOL ® G 31–35 polyol | 7.69 |
| COSCAT ® BiZn catalyst additive | 1.49 |
| SILQUEST ® A-187 additive | 1.49 |
| TECHLUBE ® BR 550 additive | 4.96 |
| Total | 100.00 |

A-Component: RUBINATE® 9700 polyisocyanate
A/B ratio: 1.20 vol/vol, 1.375 wt/wt, Index 105
Hand Mix Reaction Profile: @ 25° C. Gel 15–16 minutes, Hard 16–17 minutes
@ 175° C. Gel 33–35 sec, Hard 37–39 sec
Pultrusion conditions:
Shimmed die

| Zone 1: | 350° F. |
| --- | --- |
| Zone 2 | 350° F. |
| Pull Speed: | 20–52"/min |
| Pull Force: | 100–165 lb$_f$ |

Pultruded product has good surface appearance with no surface defects. Pultruded for more than two hours

Example 14

Evaluated in Laboratory.

| B-Component | % |
| --- | --- |
| JEFFOL ® G 30–650 polyol | 81.50 |
| JEFFOL ® G 31–35 polyol | 7.43 |
| COSCAT ® BiZn catalyst additive | 1.92 |
| SILQUEST ® A-187 additive | 1.49 |
| TECHLUBE ® BR 550 additive | 7.67 |
| Total | 100.01 |

A-Component: RUBINATE® 9700 polyisocyanate
A/B ratio: 1.15 vol/vol, 1.33 wt/wt, Index 105
Hand Mix Reaction Profile: @ 25° C. Gel 13–14 minutes, Hard 14–15 minutes
@ 175° C. Gel 31–33 sec, Hard 34–36 sec

Example 15

Evaluated in Laboratory

| B-Component | % |
| --- | --- |
| JEFFOL ® PPG 1000 polyol: | 7.43 |
| JEFFOL ® PPG 230 polyol: | 37.17 |
| JEFFOL ® PPG 400 polyol: | 29.74 |
| DABCO ® DC-2 catalyst additive: | 1.12 |
| DPG: | 18.59 |
| Molecular Sieve 4A, additive: | 1.86 |
| TECHLUBE ® BR 550 additive | 4.09 |
| Total | 100.00 |

A-Component: RUBINATE® 9433 polyisocyanate.
A/B ratio 0.857:1 vol/vol, 1.002 wt/wt, Index 105

TABLE 1

Properties of the glass fiber reinforced polyisocyanate - urethane composite at two different line speeds before aging (no painting). The formulation and conditions were otherwise as previously shown in Example-1:

| Properties | ASTM | Units Method | Parallel | Perpendicular | Parallel | Perpendicular |
|---|---|---|---|---|---|---|
| Speed | — | inches/min | 24 | 24 | 70 | 70 |
| Thickness | — | inches | 0.06 | 0.06 | 0.06 | 0.06 |
| Glass Geometry | — | — | Rovings | Rovings | Rovings | Rovings |
| SPG | D 792 | — | 2.16 ± 0.01 | 2.15 ± 0.01 | 2.13 ± 0.02 | 2.14 ± 0.01 |
| Glass (wt/wt) | D 2584 | % | 83.4 ± 0.7 | 84.2 ± 0.1 | 83.1 ± 0.2 | 81.4 ± 0.2 |
| Hardness | D 2240 | Shore "D" | 91 | 91 | 91 | 91 |
| Flexural Property D 790 | | | | | | |
| Before Aging (@ Room Temperature, 25° C.) | | | | | | |
| Flexural Modulus | | psi × $10^6$ | 7.4 | 2.5 | 7.5 | 2.4 |
| Flexural Strength | | psi × $10^3$ | 224 | 16 | 223 | 16 |
| Tensile Property D 638 | | | | | | |
| Before Aging (@ Room Temperature, 25° C.) | | | | | | |
| Tensile Modulus | | psi × $10^6$ | 8.3 | ND | 8.2 | ND |
| Tensile Strength | | psi × $10^3$ | 129 | ND | 126 | ND |
| Elongation | | % | 1.25 | ND | 1.26 | ND |
| Impact Strength D 256 | | | | | | |
| Before Aging (@ Room Temperature, 25° C.) | | | | | | |
| Notched Izod | | Ft-lbs/inch | 62 | ND | 63 | ND |
| Instrumented Impact | D 3763 | | | | | |
| Before Aging (@ Room Temperature, 25° C.) | | | | | | |
| Time to Max. Load | | msec | 3.89 ± 0.59 | — | 3.65 ± 0.13 | — |
| Maximum Load | | lb | 450.4 ± 13.3 | — | 514.8 ± 20.9 | — |
| Total Deflection | | inch | 0.62 ± 0.03 | — | 0.64 ± 0.05 | — |
| Total Energy | | ft – lb | 10.63 ± 2.07 | — | 12.17 ± 0.41 | — |
| CLTE | D 696 | (mm/mm) ° C. × $10^{-6}$ | 3.86 | 24.30 | 5.11 | 21.10 |
| HDT @ 264 psi | D 648 | ° C. | 241.9 | 100.8 | 241.9 | 122.6 |
| Water Absorption | D 570 | % (wt/wt) | 0.07 ± 0.004 | — | 0.04 ± 0.01 | — |

Note: ND = not done
The data shown in table clearly indicates that the pull speed at 24 and 75 "/min of the pultruded part had not significant effect on the ultimate physical properties.

What is claimed is:

1. A reaction system for the preparation of a fiber reinforced composite according to the pultrusion process comprising:
   (a) a reaction mixture comprising an isocyanate reactive composition, a polyisocyanate composition, and optionally one or more additives; and
   (b) a continuous fiber reinforcing material,
wherein the reaction mixture initially contains both free isocyanate groups and flee alcoholic —OH groups, has a gel time greater than 768 seconds at 25° C., and a gel time less than 120 seconds at 175° C.; and
wherein the polyisocyanate composition comprises one or more polyisocyanates of the MDI series, has a number averaged functionality of isocyanate groups in the range of from 2.3 to 2.9, and a free isocyanate group content in the range of from 10% by weight to 33.6% by weight.

2. A reaction system for the preparation of a fiber reinforced composite according to the pultrusion process comprising:
   (a) a reaction mixture comprising an isocyanate reactive composition, a polyisocyanate composition, and optionally one or more additives; and
   (b) a continuous fiber reinforcing material,
wherein the reaction mixture initially contains both free isocyanate groups and free alcoholic —OH groups, has a gel time greater than 768 seconds at 25° C., and a gel time less than 120 seconds at 175° C.; and
wherein the isocyanate reactive composition comprises a mixture of (i) from greater than 0 up to 20% by weight of at least one polyol having a number averaged molecular weight of 1500 or greater and a number averaged functionality of 2 to 4, (ii) 60 to 100% weight of at least one polyol having a number averaged molecular weight between 250 and 750 and a number averaged functionality of 3 to 4, and (iii) 2 to about 30% by weight of at least one polyol having a number averaged functionality of 2 to 3 and a number averaged molecular weight of less than 200; wherein the weights of (i)+(ii)+(iii) total 100% of the isocyanate reactive composition.

3. A reaction system for the preparation of a fiber reinforced composite according to the pultrusion process comprising:
   (a) a reaction mixture comprising an isocyanate reactive composition, a polyisocyanate composition, and optionally one or more additives; and
   (b) a continuous fiber reinforcing material,
wherein the reaction mixture initially contains both free isocyanate groups and free alcoholic —OH groups, has a gel time greater than 768 seconds at 25° C., and a gel time less than 120 seconds at 175° C.; and
wherein the isocyanate reactive composition comprises a mixture of (I) 60 to 100% weight of at least one polyol having a number averaged molecular weight between 250 and 750 and a number averaged functionality of 3 to 4, and (II) 2 to about 30% by weight of a least one polyol having a number averaged functionality of 2 to 3 and a number averaged molecular weight of less than 200; wherein the weights of (I)+(II) total 100% of the isocyanate reactive composition.

4. A reaction system for the preparation of a fiber reinforced composite according to the pultrusion process comprising:
(a) a reaction mixture comprising an isocyanate reactive composition, a polyisocyanate composition, and optionally one or more additives; and
(b) a continuous fiber reinforcing material,
wherein the reaction mixture initially contains both free isocyanate groups and free alcoholic —OH groups, has a gel time greater than 768 seconds at 25° C., and a gel time less than 120 seconds at 175° C.; and
wherein the isocyanate reactive composition comprises a total of at least 10% by weight, relative to the total weight of the isocyanate reactive composition, of at least one hydrophobic polyol selected from the group consisting of hydrocarbon backbone polyols of number averaged molecular weight greater than 500, fatty ester polyols of number averaged molecular weight greater than 500, and fatty polyester polyols of number averaged molecular weight greater than 500.

5. The reaction system according to claim 4, wherein the at least one hydrophobic polyol is a fatty polyester polyol having a number averaged functionality of organically bound isocyanate-reactive hydroxyl groups of greater than 2.

6. The reaction system according to claim 5, wherein the additive comprises an organobismuth catalyst, an organozinc catalysts, or mixtures thereof.

7. The reaction system according to claim 5, wherein the additive comprises at least one organobismuth catalyst and at least one organozinc catalyst.

8. The reaction system according to claim 5, wherein the fatty polyester polyol is castor oil.

9. A reaction system for the preparation of a fiber reinforced composite according to the pultrusion process comprising:
(a) a reaction mixture comprising an isocyanate reactive composition, a polyisocyanate composition, and optionally one or more additives; and
(b) a continuous fiber reinforcing material,
wherein the reaction mixture initially contains both free isocyanate groups and free alcoholic —OH groups, has a gel time greater than 768 seconds at 25° C., and a gel time less than 120 seconds at 175° C.; and
wherein the isocyanate reactive composition comprises castor oil and at least one other polyol.

10. A reaction system for the preparation of a fiber reinforced composite according to the pultrusion process comprising:
(a) a reaction mixture comprising an isocyanate reactive composition, a polyisocyanate composition, and optionally one or more additives; and
(b) a continuous fiber reinforcing material,
wherein the reaction mixture initially contains both free isocyanate groups and free alcoholic —OH groups, has a gel time greater than 768 seconds at 25° C., and a gel time less than 120 seconds at 175° C.; and
wherein the additive comprises an organobismuth catalyst, an organozinc catalysts, or mixtures thereof.

11. A reaction system for the preparation of a fiber reinforced composite according to the pultrusion process comprising:
(a) a reaction mixture comprising an isocyanate reactive composition, a polyisocyanate composition, and optionally one or more additives; and
(b) a continuous fiber reinforcing material,
wherein the reaction mixture initially contains both free isocyanate groups and free alcoholic —OH groups, has a gel time greater than 768 seconds at 25° C., and a gel time less than 120 seconds at 175° C.; and
wherein the additive comprises at least one organobismuth catalyst and at least one organozinc catalyst.

12. The reaction system according to claim 10, wherein the isocyanate reactive composition comprises a total of at least 10% by weight, relative to the total weight of the isocyanate reactive composition, of at least one hydrophobic polyol selected from the group consisting of hydrocarbon backbone polyols of number averaged molecular weight greater than 500, fatty ester polyols of number averaged molecular weight greater than 500, and fatty polyester polyols of number averaged molecular weight greater than 500.

13. The reaction system according to claim 11, wherein the isocyanate reactive composition comprises a total of at least 10% by weight, relative to the total weight of the isocyanate reactive composition, of at least one hydrophobic polyol selected from the group consisting of hydrocarbon backbone polyols of number averaged molecular weight greater than 500, fatty ester polyols of number averaged molecular weight greater than 500, and fatty polyester polyols of number averaged molecular weight greater than 500.

14. A reaction system for the preparation of a fiber reinforced composite according to the pultrusion process comprising:
(a) a reaction mixture comprising an isocyanate reactive composition, a polyisocyanate composition, and optionally one or more additives; and
(b) a continuous fiber reinforcing material,
wherein the reaction mixture initially contains both free isocyanate groups and free alcoholic —OH groups, has a gel time greater than 768 seconds at 25° C., and a gel time less than 120 seconds at 175° C.; and
wherein the polyisocyanate composition comprises a total of at least 5% by weight, relative to the total weight of the polyisocyanate composition, of at least one isocyanate terminated prepolymer formed from a hydrophobic polyol selected from the group consisting of hydrocarbon backbone polyols of number averaged molecular weight greater than 500, fatty ester polyols of number averaged molecular weight greater than 500, and fatty polyester polyols of number averaged molecular weight greater than 500.

15. A reaction system for the preparation of a fiber reinforced composite according to the pultrusion process comprising:
(a) a reaction mixture comprising an isocyanate reactive composition, a polyisocyanate composition, and optionally one or more additives; and
(b) a continuous fiber reinforcing material,
wherein the reaction mixture initially contains both free isocyanate groups and free alcoholic —OH groups, has a gel time greater than 768 seconds at 25° C., and a gel time less than 120 seconds at 175° C.; and
wherein the polyisocyanate composition comprises an isocyanate terminated prepolymer formed from a fatty polyester polyol having a number averaged functionality of organically bound isocyanate-reactive hydroxyl groups of greater than 2.

16. A reaction system for the preparation of a fiber reinforced composite according to the pultrusion process comprising:

(a) a reaction mixture comprising an isocyanate reactive composition, a polyisocyanate composition, and optionally one or more additives; and
(b) a continuous fiber reinforcing material, wherein the reaction mixture initially contains both free isocyanate groups and free alcoholic —OH groups, has a gel time greater than 768 seconds at 25° C., and a gel time less than 120 seconds at 175° C.; and wherein the polyisocyanate composition comprises an isocyanate terminated prepolymer formed from castor oil.

* * * * *